United States Patent
Selberg

[11] Patent Number: 5,968,399
[45] Date of Patent: Oct. 19, 1999

[54] INDUCTOR FOR INDUCTION SEALING OF PACKING MATERIAL

[75] Inventor: Hans Selberg, Lund, Sweden

[73] Assignee: Tetra Laval Holdings & Finance, S.A., Pully, Sweden

[21] Appl. No.: 09/051,613
[22] PCT Filed: Oct. 16, 1996
[86] PCT No.: PCT/SE96/01307
§ 371 Date: Jul. 13, 1998
§ 102(e) Date: Jul. 13, 1998
[87] PCT Pub. No.: WO97/14547
PCT Pub. Date: Apr. 24, 1997

[30] Foreign Application Priority Data

Oct. 17, 1995 [SE] Sweden .................................. 9503615

[51] Int. Cl.⁶ ........................................................ H05B 6/10
[52] U.S. Cl. ........................................ 219/633; 156/272.2
[58] Field of Search .................................. 219/633, 634, 219/663, 603, 608, 675, 672, 647, 649; 156/272.2, 274.2

[56] References Cited

U.S. PATENT DOCUMENTS

| | | |
|---|---|---|
| 2,777,041 | 5/1957 | Dustman . |
| 3,864,186 | 2/1975 | Balla et al. ............................. 156/272 |
| 3,879,247 | 4/1975 | Dickey ..................................... 156/272 |
| 4,704,509 | 11/1987 | Hilmersson et al. . |
| 5,021,293 | 6/1991 | Huang et al. .......................... 428/328 |
| 5,317,132 | 5/1994 | Clough .................................. 219/543 |
| 5,385,785 | 1/1995 | Lovell .................................... 428/408 |
| 5,526,561 | 6/1996 | McGaffigan ............................. 29/605 |
| 5,649,407 | 7/1997 | Blomqvist ............................. 53/374.8 |

Primary Examiner—Teresa Walberg
Assistant Examiner—Jeffrey Pwu
Attorney, Agent, or Firm—James Ray & Associates

[57] ABSTRACT

An inductor for use in sealing or heating a thermoplastic or thermoplastic coated electrically conducting packaging material, comprising a current conductor adapted to be connected to a source for high-frequency current integrated within a body of a pressed powder metal material, such as iron, having granules provided with an electrically isolating surface, such as iron oxide.

12 Claims, 1 Drawing Sheet

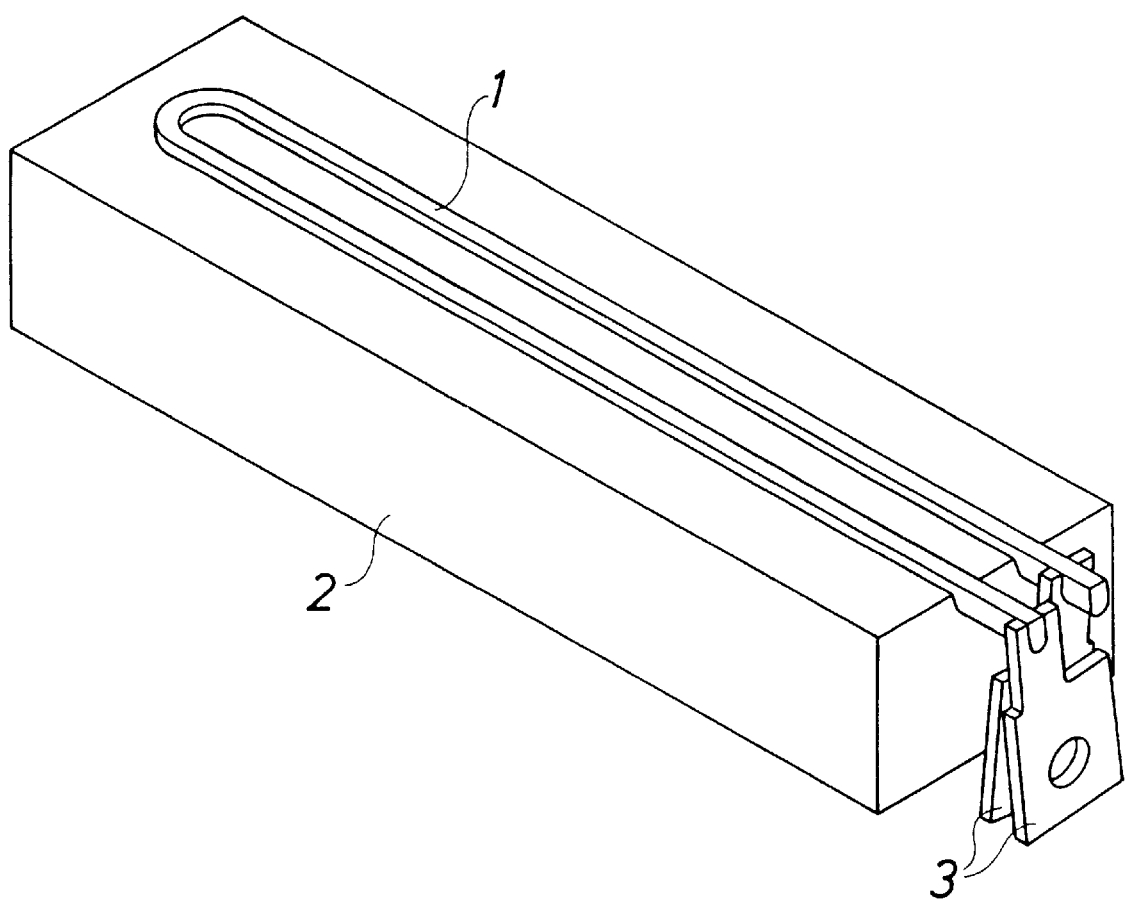

INDUCTOR FOR INDUCTION SEALING OF PACKING MATERIAL

TECHNICAL FIELD

The present invention relates to an inductor for use at sealing or heating of a thermoplastic or a thermoplastic coated electrically conducting packaging material, the inductor including a current conductor to be connected to a source for high-frequency current.

BACKGROUND OF THE INVENTION

The induction technology can advantageously be used at sealing of thermoplastic coated packaging material, including at least one layer of metal foil, preferably aluminium foil. Hereby an inductor as described above is used, which in the metal foil creates heat, melting the thermoplastic. In order to obtain a sealing the inductor is used together with a dolly.

The sealing is performed in such a way that the packaging material, which is to form a packaging, is fed stepwise or continuously, depending on the design of the apparatus. With the material lying immovable over the dolly a short while the inductor is applied against the material and is energized, so that the thermoplastic is melted. By a mechanical pressure between the inductor and the dolly with the thermoplastic molten a sealing is provided between two packaging material layers.

In accordance with previously known techniques, for example, as disclosed in applicant's U.S. Pat. No. 4,704,509, issued Nov. 3, 1987, (which patent is hereby incorporated by reference), conductor is for example constituted of a copper conductor cast into plastic material containing ferrite. As disclosed in applicant's above-identified U.S. Patent, the high frequencies normally employed in such sealing processes are normally between 2 MHz and 100 MHz.

A critical property of the inductor is the possibility to maintain the current conductor at a decently low working temperature in spite of a high-frequency on the sealing operations, i.e. to cool the current conductor. In a previously known inductor this is obtained in that the current conductor is a copper tube directly cooled with water. This design is very sensitive to mechanical loads, and the life span is short due to collapsed copper tubes/current conductors.

For this reason known conductors have worked against comparatively soft dollies, and their current conductors may have been provided with ridges for obtaining sufficient mechanical clamping force.

At sealing of new packaging materials, for example thermoplastic coated plate material, and filling of products, which are difficult to handle, for example highly viscous products, it is called for stronger inductors with improved possibilities to handle mechanical loads. These demands can hardly be fulfilled with inductors of conventional types.

THE INVENTION

In order to solve the above mentioned and other problems and in order to achieve an inductor with improved properties and with greater field of use than previously known inductors an inductor according to the invention is characterized in that the current conductor is integrated in a body of a powder metal material, whose granules are provided with an electrically isolating surface layer.

The powder material is preferably constituted of granules of an iron material with a surface layer of iron oxide. In the material there is also a small amount, for example 0.5%, of a plastic based binder, such as a phenol based binder.

In pressed condition this material has excellent mechanical properties, high permeability at used frequencies, small magnetic remagnetizing losses, good heat conductivity and high resistance to temperatures.

The current conductor in the inductor according to the invention does not demand any direct cooling, for example with water, which means that it can be made in a homogeneous rod, usually of copper, which per se increases the ability of the inductor to withstand mechanical loads. The cooling is instead accomplished indirectly in that the heat is conducted away effectively by the powder material. If, however, extra cooling under special circumstances is needed, cooling canals can be provided in the body of the inductor and be made wider, so that also the risk for blocking is increased.

The inductor according to the invention will, as previously stated, have the possibility to withstand considerably higher loads than the previously known inductor. This makes it possible to use harder dollies, which can be required when new packaging materials and more difficult products are to be used. The life span increases considerably.

The new inductor makes it possible to use butt cutting. The improved mechanical strength of the inductor opens new possibilities for material combinations.

The powder material is comparatively cheap, and the manufacturing process (the powder pressing with inserted current conductor) is rational.

THE DRAWING

The invention will be further described below under reference to the attached drawing, which shows a practical embodiment of an inductor according to the invention.

DETAILED DESCRIPTION OF EMBODIMENTS

An inductor according to the invention includes in its simplest form a current conductor 1, which is pressed into a body 2 of powder metal material, whose granules are provided with an electrically isolating surface layer.

The current conductor 1 can have the U-shape shown in the drawing and be provided with contacts 3 for connection of the current conductor to a source for high-frequency current at its end extending out of the body 2. The current conductor 1 suitably extends slightly up over the surface of the body 2 and can here be planar.

The current conductor 1 is preferably made of homogeneous copper, which gives relatively small resistive conducting losses, but any other material with good electrically conducting properties can equally well be used. The current conductor is preferably provided with a thin electrically conducting lacquer layer.

The material in the metal body 2 is constituted by a powder metal material, whose granules of an electrically conducting iron material also after compression under high pressure to a homogeneous body are mutually electrically isolated from each other in that they are provided on their surfaces with an electrically isolating layer, namely an iron oxide layer. The powder metal material also contains a small amount of binder, for example 0.5%. The binder is for example phenol based.

In its simplest form the inductor according to the invention can be produced in that the conductor 1 is placed in a form, which is filled with metal powder, that is then pressed together to the integrated inductor without loosing the electrically isolating properties of the metal granules. In order to safeguard the isolating properties of the surface layer of the granules the metal powder should be handled or machined to a minimal extent.

The following requirements on the metal material in the body 2 are well fulfilled by the used material:

good mechanical properties high permeability at frequencies $\geq 20$ kHz electrically isolating small magnetic remagnetizing losses at $\geq 20$ kHz good heat conductivity $\lambda \geq 10$ W/m°K ability to withstand temperature $\geq 120°$ C.

possibility to integrate for example copper material at the forming process.

The used powder material has for example as good heat conducting properties as $\lambda \approx 12$ W/m°K, which is about 15 times better than the material used in present inductor designs. Further, the metallic powder material has such a high permeability as $\mu r > 25$, which is more than 10 times better than presently used plastic materials.

Due to the indirect cooling of the current conductor a great freedom to form the conductor is provided.

The free form of the current conductor makes it possible to control the temperature and the pressure.

A current conductor or current solenoid with several turns leads to an improved efficiency (considerably improved energy generating).

Alternatively the current conductor can be multi-threaded, which also increases the efficiency.

The high permeability of the powder material means that ordinary metallic materials can be used relatively close to the current conductor without any substantial losses of power.

Practical tests with an inductor constructed in accordance with the drawing—with and without cooling canals and cooling water—have given the following good results:

an indirectly cooled inductor with 4 l/min cooling water maintains a steady temperature of about 28° C., an indirectly cooled inductor with 1 l/min cooling water maintains a steady temperature of about 29° C., an inductor without water cooling maintains a steady temperature of about 50° C.

As mentioned above, alternative designs of the inductor are possible.

It is for example possible to manufacture the inductor as a U-shaped strip of metal och possibly plastic, the powder material and the current conductor being arranged in said strip. Cooling canals can possibly be arranged in the bottom of the strip.

Another and perhaps more interesting design is to press together in a form on one hand an ordinary metal powder (with a thickness of for example 10 mm) and on the other hand the powder metal material with the isolating granules and the current conductor.

Generally speaking, different material combinations can be possible, and the powder metal material with the isolating granules can have a rather limited thickness due to its excellent electrical and magnetic properties.

The inductor can be provided with a plastic layer or the like on the surface as a corrosion protection.

The inductor according to the invention is normally used for sealing (or possibly other heating) of thermoplastic coated packaging material, which has an electrically conducting layer, ordinarily a metal foil. The packaging material can, however, also be an electrically conducting thermoplastic.

The invention has been described in its application for packaging material, but it shall not be limited thereto.

I claim:

1. An inductor for use in sealing or heating of a thermoplastic or thermoplastic coated electrically conducting packaging material, the inductor comprising a current conductor (1) adapted to be connected to a source for high-frequency current integrated within a body (2) of a pressed powder metal material having granules provided with an electrically isolating surface.

2. An inductor according to claim 1, wherein the powder material comprises granules of iron material with a surface layer of iron oxide.

3. An inductor according to claim 1, wherein the powder material contains a small amount of a binder, on the order of about 0.5%.

4. An inductor according to claim 1, wherein the current conductor (1) comprises a U-shaped homogeneous rod.

5. An inductor according to claim 1, wherein the current conductor (1) comprises a solenoid with several turns.

6. An inductor according to claim 1, wherein the current conductor (1) is multi-threaded.

7. An inductor according to claim 1, wherein cooling canals for circulating cooling water, are arranged in the body of powder material.

8. An inductor according to claim 1, wherein said inductor comprises a U-shaped strip, in which the current conductor and the powder metal material are arranged.

9. An inductor according to claim 8, wherein cooling canals for cooling water, are arranged in a bottom wall of the U-shaped strip.

10. An inductor according to claim 1, wherein the powder metal material with the current conductor is integrated by pressing with an ordinary metal powder.

11. An inductor according to claim 3, wherein the binder is a phenol based binder.

12. An inductor according to claim 8, wherein cooling canals for cooling water, are arranged in one or more side walls of the U-shaped strip.

* * * * *